US012605742B2

(12) United States Patent
Nägele et al.

(10) Patent No.: US 12,605,742 B2
(45) Date of Patent: Apr. 21, 2026

(54) SCREEN TENSIONER FOR TENSIONING A SCREEN LINING

(71) Applicant: Kleemann GmbH, Göppingen (DE)

(72) Inventors: Florian Nägele, Hüttisheim (DE); Emil Scheurer, Wangen (DE); Angelos Morfoyannis, Göppingen (DE)

(73) Assignee: Kleemann GmbH, Göppingen (DE)

( * ) Notice: Subject to any disclaimer, the term of this patent is extended or adjusted under 35 U.S.C. 154(b) by 53 days.

(21) Appl. No.: 18/743,221

(22) Filed: Jun. 14, 2024

(65) Prior Publication Data

US 2025/0058356 A1 Feb. 20, 2025

(30) Foreign Application Priority Data

Aug. 15, 2023 (DE) ..................... 10 2023 121 746.1

(51) Int. Cl.
*B07B 1/48* (2006.01)

(52) U.S. Cl.
CPC ..................................... *B07B 1/48* (2013.01)

(58) Field of Classification Search
CPC ............ B07B 1/46; B07B 1/4609; B07B 1/48
USPC .......................................................... 209/405
See application file for complete search history.

(56) References Cited

U.S. PATENT DOCUMENTS 3,406,823 A * 10/1968 Crain ........................ F16F 1/02 209/403
3,608,482 A * 9/1971 Bubley ................... B41F 15/36 101/415.1
4,539,734 A * 9/1985 Messerschmitt ...... F16B 5/0692 160/383
7,578,394 B2 * 8/2009 Wojciechowski .... B07B 1/4645 209/276
8,002,116 B1 * 8/2011 Cato ......................... B07B 1/46 209/318
2001/0052484 A1 * 12/2001 Fallon ....................... B07B 1/46 209/311
2007/0108106 A1 * 5/2007 Burnett ................... B07B 13/16 209/325

FOREIGN PATENT DOCUMENTS

CA 3006973 A1 * 12/2018 ............... B07B 1/48
CN 114682487 A * 7/2022
DE 2501750 A1 * 7/1975
DE 102023121746 B3 * 10/2024 ............... B07B 1/48
(Continued)

OTHER PUBLICATIONS

German Office Action for corresponding patent application No. 10 2023 121 746.1, dated Mar. 19, 2024, 8 pages.

*Primary Examiner* — Terrell H Matthews
(74) *Attorney, Agent, or Firm* — Lucian Wayne Beavers; Patterson Intellectual Property Law, PC

(57) ABSTRACT

A screen tensioner for tensioning a screen lining in a screening machine includes a bar-like tensioning section including two longitudinal end portions with a fastening section defined on each of the longitudinal end portions, the tensioning section including first and second oppositely facing tensioning edges defined on the tensioning section and extending between the two fastening sections, the first tensioning edge forming a first tensioning contour and the second tensioning edge forming a second tensioning contour, the first and second tensioning contours having different geometries from each other.

20 Claims, 4 Drawing Sheets

(56) References Cited

FOREIGN PATENT DOCUMENTS

| | | | | | |
|---|---|---|---|---|---|
| DE | 102023131848 | B3 | * | 12/2024 | |
| EP | 238455 | A | * | 9/1987 | ............... B07B 1/46 |
| EP | 0238455 | A2 | * | 9/1987 | |
| EP | 0641608 | A2 | * | 3/1995 | |
| NO | 329948 | B1 | * | 1/2011 | ......... B01D 33/0376 |
| WO | WO-2005068092 | A1 | * | 7/2005 | ............... B07B 1/48 |

* cited by examiner

SCREEN TENSIONER FOR TENSIONING A SCREEN LINING

RELATED APPLICATION

This application claims priority to German Patent Application Ser. No. DE 10 2023 121 746.1 filed Aug. 15, 2023, which is incorporated herein by reference.

BACKGROUND OF THE DISCLOSURE

Field of the Disclosure

The disclosure relates to a screen tensioner for tensioning a screen lining in a screening machine, wherein the screen tensioner has a bar-like or section-like tensioning section, which has a fastening section in the area of each of its two longitudinal ends.

The disclosure furthermore relates to a screening machine comprising a screen tensioner.

Description of the Prior Art

DE 25 01 750 A discloses a screening machine crusher having a screen tray. Three screen linings are superposed inside the screen tray. These screen linings are designed as wire racks that have a folded edge at their longitudinal ends. The folded edges are bent in the direction from the top of the screen lining to the bottom. The folded edges have a V-shaped cross-section. Screen tensioners, which are designed in the form of bars, engage with these folded edges. The screen tensioner has a tensioning projection forming a tensioning edge at one tensioning end. This tensioning edge rests against the base of the folded edge. At the longitudinal ends, the screen tensioners have fastening sections on which the tensioning elements act to tension the screen lining in the screen tray.

When this known device is used to tension the screen tensioner, the screen tension is uneven along the length of the screen tensioner. Accordingly, there are screen areas that are subject to a greater preload than adjacent screen areas. The different screen tension leads to a vibration behavior of the screen lining, which results in premature failure before the maximum service life of the screen lining is reached.

EP 0 238 455 A2 discloses a screening machine, in which a screen tensioner in the form of a hollow section is used to pretension a screen lining. The screen tensioner has a molded tensioning projection that forms a tensioning edge.

This problem is exacerbated if different types of screen linings are to be optionally installed by the user. Solid screen linings require a greater preload than less solid screen linings. It is therefore necessary to have different screen tensioners for different types of screen linings. The user must then ensure that the correct screen tensioner is assigned to the individual screen lining.

SUMMARY OF THE DISCLOSURE

The disclosure addresses the problem of providing a user with a simple way of tensioning different types of screen linings.

This problem is solved in that the tensioning section of the screen tensioner has a first tensioning projection in the area of a first tensioning end, which first tensioning projection forms a first tensioning edge, and has a second tensioning projection on an opposite second tensioning end, which second tensioning projection forms a second tensioning edge, in that the first tensioning edge and the second tensioning edge extend between the two fastening sections, and in that the first tensioning edge forms a first tensioning contour and the second tensioning edge forms a second tensioning contour and in that the first and second tensioning contours have different geometries.

As the screen tensioner has two tensioning edges, it can bring either one or the other tensioning edge into tensioning engagement with the screen lining to be fitted. The tensioning edges have different geometries and are therefore designed for individual screen linings. This allows the user to tension two different screen linings in one screening device using one screen tensioner without having to change the screen tensioner. The same screen tensioner, which can preferably be used in two different mounting positions in an inverted manner. This greatly facilitates the maintenance of the screening machine.

According to the disclosure, one of the two tensioning edges may be convex having a curvature extending between the two fastening sections and the other tensioning edge may be convex or concave having a curvature extending between the two fastening sections, or the other tensioning edge may extend in a straight line between the two fastening sections. If one tensioning edge is convex and the other tensioning edge is concave, then it is advantageous if the contours that the two tensioning edges follow differ from each other, preferably such that the amount of camber is different on both ends.

The curvature of the convex tensioning edge of the one tensioning projection can be designed for a matching screen lining in order to clamp it in the screen tray with the most uniform tension possible. When tensioning the screen lining, the tensioning edge having the most protruding area first comes into contact with the assigned fastening edge of the screen lining and tensions the latter there. As the screen tensioner is tensioned further, it deforms elastically, wherein the remaining areas of the tensioning edge gradually come into contact with the screen lining and tensioning it. As a result, uniform tension is achieved across the entire width of the screen lining. This takes account of the fact that evenly tensioned screen linings have a longer service life and that the inherent properties of the screen lining, such as self-cleaning, are supported.

If the second clamping edge is also convex, the degree of curvature can be designed for the corresponding screen surface in order to ensure that it is pre-tensioned evenly.

If the second tensioning edge is concave, this type of screen tensioner is suitable for screen linings that require greater tension on two sides of the lining. Accordingly, these first come into contact with the concave geometry of the screen tensioner.

If the second tensioning edge is straight, the screen tensioner can be used on the straight edge for screen linings that only require little screen tension. The second tensioning edge is therefore intended for light, delicate screen linings, for instance. These require less preload. Due to the lower pre-tensioning force, a strongly curved tensioning edge is not elastically deformed to the same extent, such that the outer areas of the light screen lining do not make contact with the tensioning edge and remain untensioned.

According to the disclosure, provision may be made for the tensioning contours of the first tensioning edge and the second tensioning edge to each have contour end sections in the area of their ends facing the fastening sections and a contour center between the contour end sections, such that when the tensioning edge is projected into the central transverse plane (Q), the contour center of at least one of the tensioning edges is offset with respect to the contour end sections in or against the tensioning direction at maximum camber. Obviously, for instance, provision may be made for the tensioning edge to be convex or concave, wherein the amount of camber is determined by the size of the indentation if the tensioning edge is concave. If the tensioning edge is convex, the amount of camber results as the outwardly projecting protrusion of the tensioning contour. According to a first variant of the disclosure, provision may be made for the amount of camber of the first tensioning edge to differ from the camber of the second tensioning edge. In this way, two different tensioning contours can easily be achieved. The tensioning contours of the two tensioning edges can both be convex or both concave or one tensioning edge can be convex and the other tensioning edge can be concave.

Preferably, however, the projection of one tensioning edge into the central transverse plane may form a camber and the projection of the other tensioning edge into the central transverse plane may form a straight line. One tensioning edge can therefore be convex or concave and the other straight.

If a convex or concave geometry is used for the tensioning edge, provision may preferably be made for the amount of camber (H) to be less than or equal to 25 mm. Such screen tensioners are suitable for use in screening machines that are used in conjunction with rock crushers or crushers for processing mineral material. The maximum length of the screen tensioner is preferably less than 1800 mm.

According to the disclosure, provision may be made for the tensioning section to have a top and a bottom and for the screen tensioner to be designed symmetrically to the central transverse plane extending between the top and the bottom, at least in the area of its tensioning section. This screen tensioner can be easily mounted on a cover and has a compact design.

If provision is made for the first and/or the second tensioning edge to have a fillet extending between the top and the bottom of the tensioning section, then the stress peaks transferred to the screen lining are avoided or reduced.

According to one variant of the disclosure, assembly is facilitated by at least one of the fastening sections having at least one identification marking, which is assigned to the first and/or the second tensioning end, wherein the identification marking is preferably designed as a recess and is further preferably incorporated into the longitudinal end of the fastening section.

A possible variant of the disclosure can be such that the convex or concave tensioning edge is circular or elliptical in shape or is composed of several contour sections. This allows the tensioning edge to be individually adapted to a screen lining. Preferably, the tensioning edge follows a continuously differentiable function in the direction between the two fastening sections to achieve a stress-optimized structure.

The problem of the disclosure is also solved using a screening machine having a screen device, which has a screen lining, wherein a screen tensioner according to any of claims 1 to 8 acts on the screen lining.

In particular, provision may be made for the screen lining to have a fastening edge at at least one of its longitudinal ends, which fastening edge is designed in the form of a bend, and for one of the tensioning projections of the screen tensioner to engage with the bend.

BRIEF DESCRIPTION OF THE DRAWINGS

The disclosure is explained in greater detail below based on exemplary embodiments shown in the drawings.

In the figures.

DETAILED DESCRIPTION

Figure 1:
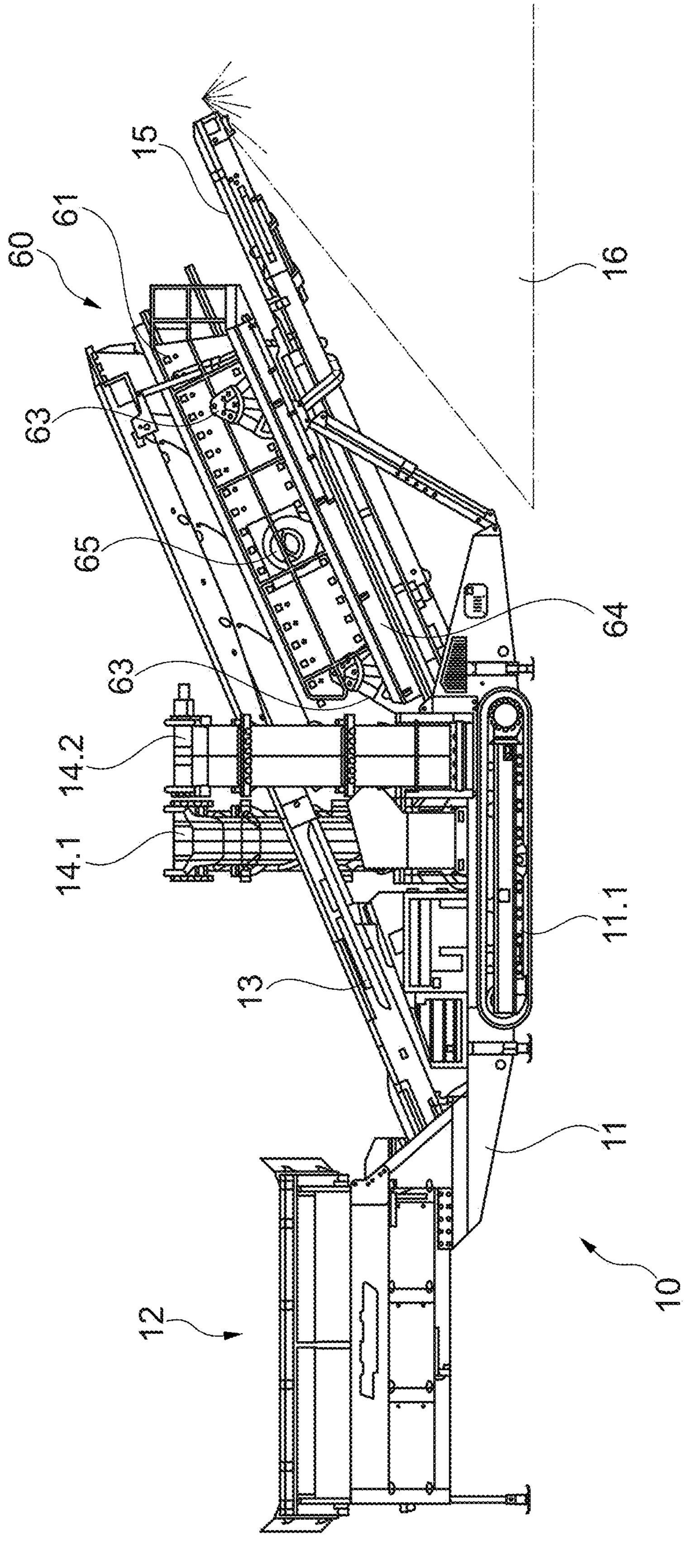
FIG. 1 shows a side view of a screening machine.

FIG. 1 shows a screening machine 10 according to the disclosure. This screening machine 10 is designed as a mobile screening machine 10. It is also conceivable that the disclosure could be used in a stationary screening machine.

The screening machine 10 has a chassis 11, which is supported by undercarriages 11.1 to be able to move the screening machine. Preferably, the screening machine 10 has a feed hopper 12. A wheel loader can be used to fill material to be screened into the feed hopper 12.

The feed hopper 12 has a transport device, for instance a vibrating chute, a conveyor belt, a feed belt or a bunker discharging conveyor, by means of which the fed material can be conveyed to an infeed belt 13. The infeed belt 13 can be designed as an endless circulating conveyor belt. The infeed belt 13 conveys the material to be screened to a screen device, which has a screen tray 60.

Figure 2:
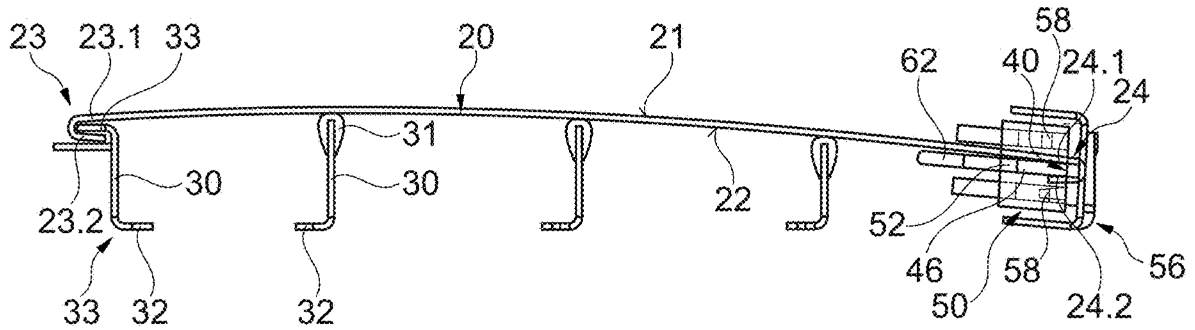
FIG. 2 shows a schematic diagram of a screen deck of the screening machine of FIG. 1.

The screen device is used to screen out at least two fractions from the material fed in. For this purpose, the screen device has at least one screen lining 20, as shown in FIG. 2.

FIG. 1 further illustrates that the screen tray 60 has end walls 61 which extend in the longitudinal direction of the screen.

The screen tray 60 is mounted on a stationary screen tray support 64 by means of spring elements 63. A drive 65 can be used to oscillate the screen tray 60 to screen the material.

At least one discharge belt 14.1, 14.2 or at least one fine grain or stockpile belt 15 is assigned to the screen device. In this exemplary embodiment, two discharge belts 14.1, 14.2 and a fine-grain or stockpile belt 15 are used. Accordingly, two screen linings 20 are installed in the screen device.

The material to be screened is fed onto the upper screen lining 20. The material that falls through the upper screen lining 20 reaches the screen lining 20 below. Material that does not fall through the upper screen lining 20 reaches one of the two discharge belts 14.1, 14.2. The material that does not fall through the second screen lining 20 reaches the second discharge belt 14.1, 14.2. The material, which falls through both screen linings 20 in the form of fine-grain material, reaches the fine-grain or stockpile belt 15. The two discharge belts 14.1, 14.2 and the fine grain or stockpile belt 15 convey the grain fractions fed thereto onto stockpiles 16.

FIG. 2 shows a schematic representation of a screen device. As the illustration shows, support elements 30 are installed in the screen tray 60 to support the screen lining 20. The support elements 30 have a mounting foot 32 with which they are stationarily mounted in the screen tray 60. Opposite from the mounting foot 32, damping elements 31 are mounted on one end of the support elements 30 in a replaceable manner. The damping elements 31 support the screen lining 20 in the area of the bottom of the screen 22.

The support elements 30 can be arranged and aligned with their damping elements 31 in such a way that the screen lining 20 resting on the damping elements 31 forms a curved contour in the longitudinal direction of the screen, as FIG. 2 shows.

The support element 30 on the left-hand side in FIG. 2 has a holder neck 33 at its end facing away from the mounting foot 32. The screen lining 20 is held replaceably on the holder neck 33 by a fastening edge 23.

The screen lining 20 is designed as a flat element and has a screen top 21 opposite from the screen bottom 22. The fastening edge 23 may be bent away from an end section 23.1 of the screen lining 20 to form a bend 23.2. The holding lug 33 engages with this bend 23.2.

At the end facing away from the fastening edge 23, the screen lining 20 has a further fastening edge 24, which is essentially of the same design as the fastening edge 23. Accordingly, a bend 24.2 is bent away from the screen lining 20 at the opposite end section 24.1.

Figure 3:
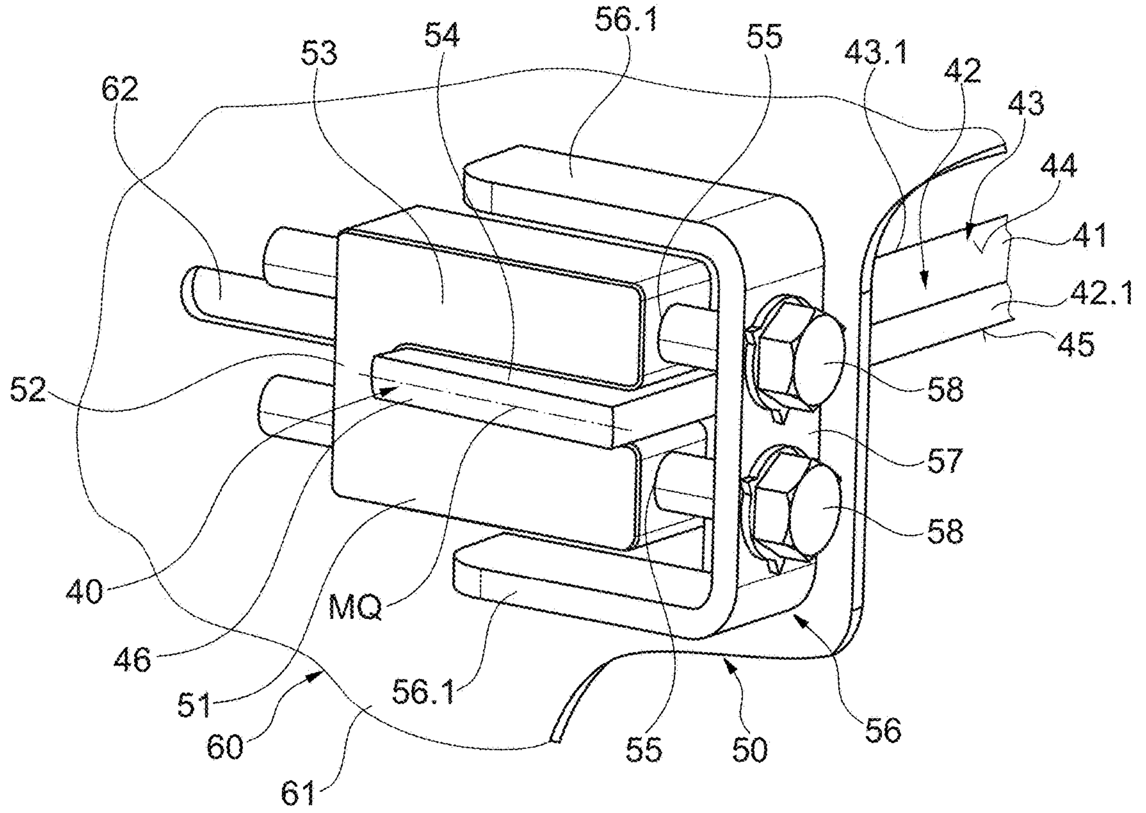
FIG. 3 shows a partial perspective view of a tensioning device for a screen lining of the screening machine of FIG. 1.
Figure 5:
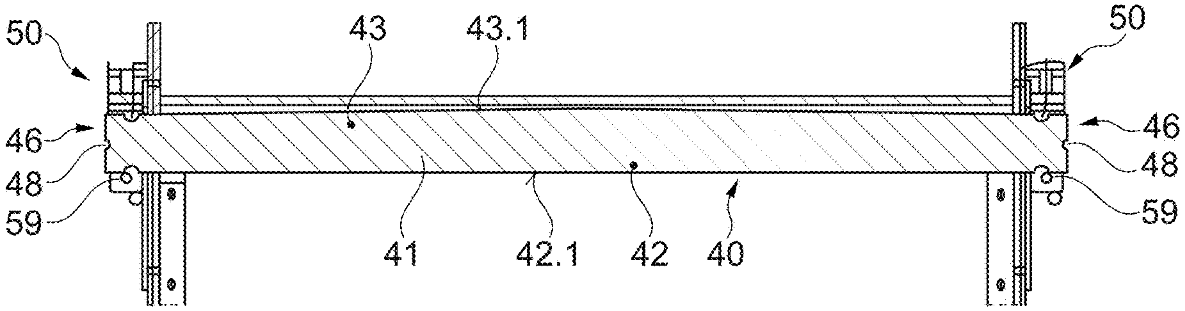
FIG. 5 shows an extended view of the representation of FIG. 4
Figure 6:
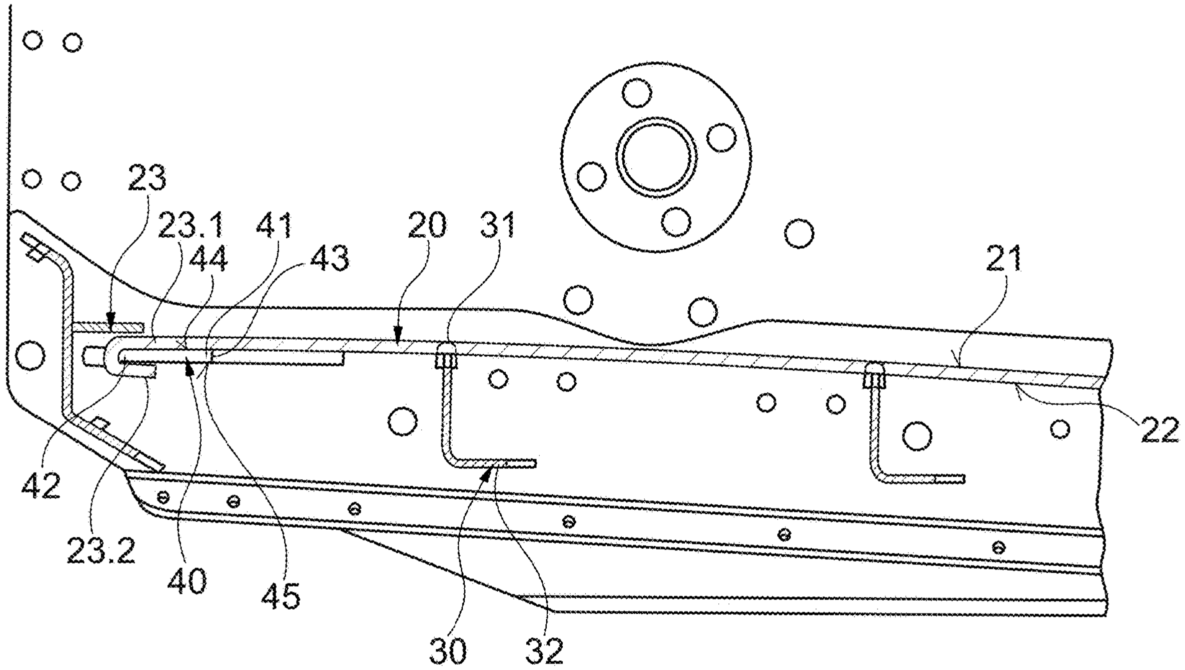
FIG. 6 shows a further embodiment of the disclosure, in which a screen tray of the screening machine of FIG. 1 is shown in schematic sectional view through a screen lining.

The screen lining 20 has to be tensioned in the screen tray 60 in the longitudinal direction (i.e., from left to right in FIG. 2). A screen tensioner 40 is used for this purpose. FIGS. 3 and 5 illustrate that the screen tensioner 40 is essentially rectangular in cross-section. The screen tensioner 40 can therefore have a bar-shaped geometry. The bar-shaped screen tensioner 40 may also be referred to as a tensioning bar 40.

The screen tensioner 40 has a central tensioning section 41, which extends between two end fastening sections 46.

The tensioning section 41 has tensioning projections 42, 43 on its opposite longitudinal ends. The longitudinal ends may also be referred to as longitudinal end portions. The first tensioning projection 42 has a first tensioning edge 42.1. The second tensioning projection 43 has a second tensioning edge 43.1.

Figure 4:
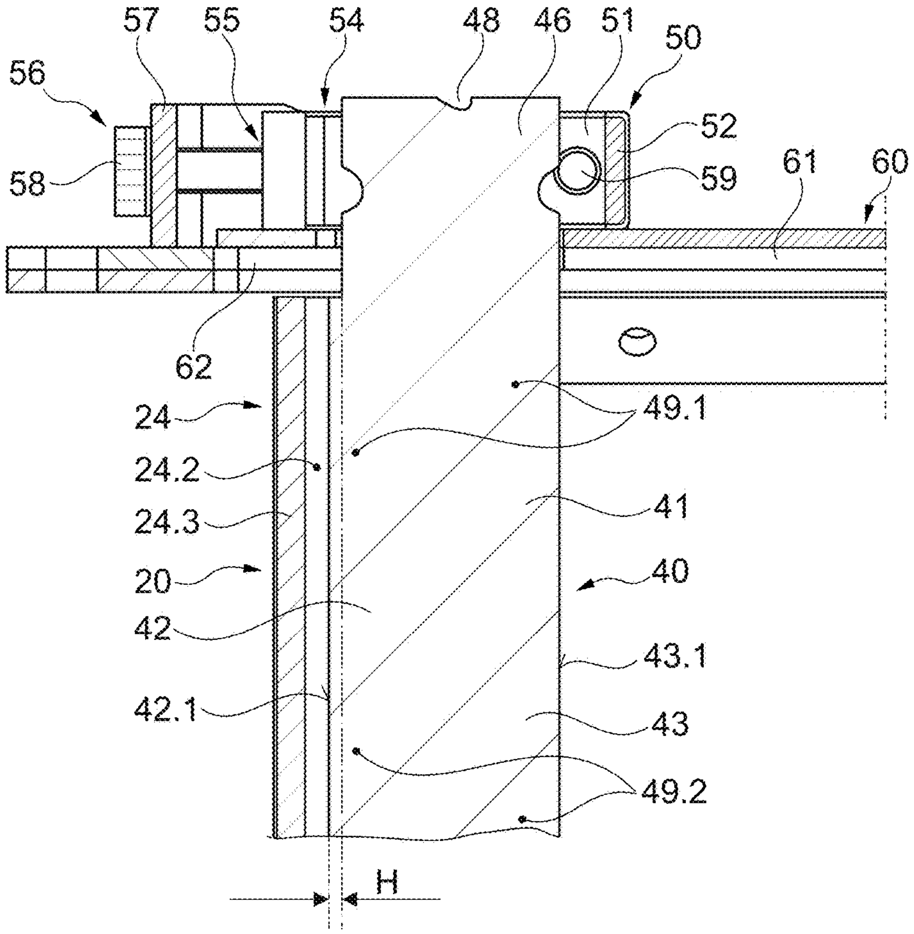
FIG. 4 shows a top view and partial view of a screen tensioner for the screening machine of FIG. 1 in relation to a screen lining and as a horizontal section.

The first tensioning edge 42.1 extends convexly curved between the two fastening sections 46, as illustrated for instance in FIG. 4. FIG. 4 shows a horizontal section through the central transverse plane MQ of the screen tensioner 40. The central transverse plane MQ and thus the sectional plane according to FIG. 4 is shown in FIG. 3.

FIG. 4 shows that the first tensioning edge 42.1 forms a tensioning contour. This tensioning contour has contour end sections 49.1 at its longitudinal ends and a contour center 49.2 in the middle between the contour end sections 49.1. In the tensioning direction, which extends from right to left in FIG. 4, the projection of the first tensioning edge 42.1 into the central transverse plane MQ has a maximum camber H in the area of the contour center 49.2. This maximum camber H results from the fact that the contour center 49.2 is offset in the tensioning direction compared to the contour end sections 49.1 due to the convex curvature. Preferably, the camber H is less than 25 mm.

The second tensioning edge 43.1, which is opposite from the first tensioning edge 42.1, also forms a tensioning contour. This tensioning contour again forms contour end sections 49.1 at opposite ends, which face the fastening sections 46. A contour center 49.2 is formed in the middle between the contour end sections 49.1. In this exemplary embodiment, the projection of the second tensioning edge 43.1 in the central transverse plane MQ extends in a straight line between the two fastening sections 46, as FIG. 4 shows. However, it is also conceivable that the second tensioning edge 43.1 is convexly curved and has a maximum camber, which preferably differs from the maximum camber H of the first tensioning edge 42.1.

It is also conceivable that the second clamping edge 43.1 forms a concave contour. In this case, there is a negative camber H in the center of the contour 49.2. It is preferable that the amount of the two cambers H of the two tensioning edges 42.1, 43.1 deviate from each other.

In other words, different tensioning contours are implemented on the screen tensioner 40 at the two tensioning edges 42.1, 43.1.

As the illustrations further show, it is preferable that the screen tensioner 40 is constructed symmetrically to the central transverse plane MQ.

In the exemplary embodiment shown, the screen tensioner 40 engages with its first tensioning projection 42 in the right-hand bend 24.2 shown in FIG. 2. The first tensioning edge 42.1 of the screen tensioner 40 is in contact with the base section 24.3 below the bottom of the screen 22, which base section results from the bend 24.2. The tensioning projection 42 is thus at least partially enclosed between the bottom of the screen 22 and the bend 24.2.

The fastening sections 46 of the screen tensioner 40 penetrate feedthroughs 62 in the assigned end walls 61 of the screen tray 60 on opposite ends, as FIG. 3 clearly shows. Accordingly, the fastening sections 46 protrude on the outside beyond the end walls 61 of the screen tray 60. Tensioning devices 50, which can be used to adjust the screen tensioner 40 in the tensioning direction along the central transverse plane MQ are arranged in the area of the feedthroughs 62 of the screen tray 60.

The tensioning devices 50 each have a stationary support bearing 56, which is preferably firmly connected, for instance welded, to the end wall 61.

The support bearing 56 can be designed such that it has a holder 57 to which at least one bearing piece 56.1 is connected, preferably integrally formed. By means of the two bearing pieces 56.1 and the holder 57, the support bearing 56 can be firmly connected to the assigned end wall 61. The tensioning device 50 also has a tensioning piece 52, which engages behind the screen tensioner 40 in a form-fitting manner to move it in the tensioning direction. Legs 51, 53 may be connected, preferably molded, to the tensioning piece 52 on opposite ends.

Between the legs 51, 53 there is a mount 54 for the screen tensioner 40. The leg 53 overlaps the top and the leg 51 overlaps the bottom of the screen tensioner 40 such that the screen tensioner 40 is prevented from moving in these directions when it is tensioned.

At least one tensioning screw 58 is used to adjust the tensioning piece 52 in the tensioning direction, by means of which tensioning screw the tensioning piece 52 can be continuously adjusted. In so doing, the tensioning screw 58 rests against the holder 57. The tensioning piece 52 can be continuously adjusted via a threaded connection.

In this exemplary embodiment, each of the legs 51, 53 has a threaded mount 55. The holder 57 has two feedthroughs through which the tensioning screws 58 are inserted and screwed into the threaded mounts 55.

FIGS. 4 and 5 show an assembly position in which the screen tensioner 40 is in an untensioned position. If the tensioning screws 58 of the two tensioning devices 50 are then tightened, the first tensioning edge 42.1 meets the base section 24.3 (see FIG. 4) of the bend 24.2 in the area of its contour center 49.2 with its maximum camber H. If the tensioning screws 58 are now tightened further, the screen lining 20 is tensioned starting from the contour center 49.2.

This results in a counterforce of the screen lining 20, which acts on the screen tensioner 40. Owing to this counterforce, the screen clamp 40 is bent such that the first clamping edge 42.1 continuously moves towards the two contour end sections 49.1 on the base section 24.3. In this way, the tensioning force is gradually applied to the screen lining 20. The convexly curved contour of the first tensioning edge 42.1 thus ensures uniform tensioning of the screen lining 20.

When tensioning the tensioning devices 50, the tensioning piece 52 is moved in the tensioning direction. This ensures that the fastening section 46 in FIG. 3 is offset from left to right along the slot-shaped feedthrough 62.

Once a sufficiently uniform tension has been generated in the screen lining 20, the assembly process is complete. The uniform tension can be estimated by a sound test at individual points on the screen lining 20. For this purpose, the screen lining 20 is struck at various points. The tensioning state can be deduced from the sound produced.

The screen lining 20 is removed in reverse order. To this end, first loosen the tensioning screw 58, then the screen tensioner 40 can be moved in the feedthroughs 62 until it is no longer engaged with the bend 24.2. The screen lining 20 can then be lifted upwards and moved in the opposite direction to the tensioning direction such that the bend 23.2 is no longer engaged with the holding lug 33 (see FIG. 2). The screen lining 20 can then be lifted out of the screen tray 60 and replaced with a new screen lining 20.

If the second screen lining 20 is not identical to the first screen lining 20 and requires a different, in particular less preload than the previously installed screen lining 20, the screen tensioner 40 can be used adapted to this second screen lining 20, for which it only has to be rotated such that the second tensioning edge 43.1 comes into engagement with the assigned bend 24.2 of this screen lining 20. The screen tensioner 40 can then be clamped to the new screen lining 20 again in the same way as explained above.

In other words, the screen tensioner 40 can be used to optimally tension two different screen linings 20.

In order to facilitate for a user to correctly assign the desired tensioning edge 42.1, 43.1 to the individual screen lining 20, an identification marking 48 can be provided in the area of at least one fastening section 46. The identification marking 48 is shown in FIG. 4 by way of example. Preferably, the identification marking 48 is incorporated into the longitudinal end of the fastening section 48.

The invention claimed is:

1. A screen tensioner for tensioning a screen lining in a screening machine, the screen tensioner comprising:
- a tensioning bar including a central tensioning section located between two fastening sections, the fastening sections being formed on two longitudinal end portions of the tensioning bar, the tensioning bar including first and second oppositely facing tensioning edges defined on the tensioning section, the first tensioning edge forming a first tensioning contour and the second tensioning edge forming a second tensioning contour, the first and second tensioning contours having different geometries from each other.

2. The screen tensioner of claim 1, wherein:
- one of the first and second tensioning contours has a convex curvature extending between the two fastening sections, and the other of the first and second tensioning contours has a convex or concave curvature or extends in a straight line between the two fastening sections.

3. The screen tensioner of claim 1, wherein:
- the tensioning bar includes a top surface and a bottom surface extending between the first and second tensioning edges; and
- each of the first and second tensioning contours includes two contour end sections and a contour center between the contour end sections, and an intersection of each of the first and second tensioning contours with an imaginary central transverse plane lying between the top surface and the bottom surface and extending between the first and second tensioning edges has the contour center of each of the first and second tensioning contours offset with respect to the contour end sections of the respective tensioning contour in or opposite to a tensioning direction thereby defining a maximum camber of the respective tensioning contour; and
- the maximum camber of the first tensioning contour differs from the maximum camber of the second tensioning contour.

4. The screen tensioner of claim 3, wherein:
- an amount of the maximum camber of each of the first and second tensioning contours is less than or equal to 25 mm.

5. The screen tensioner of claim 1, wherein:
- the tensioning bar includes a top surface and a bottom surface extending between the first and second tensioning edges; and
- one of the first and second tensioning contours includes two contour end sections and a contour center between the contour end sections, and an intersection of the first and second tensioning contours with an imaginary central transverse plane lying between the top surface and the bottom surface and extending between the first and second tensioning edges has the contour center of the one of the first and second tensioning contours offset with respect to the contour end sections in or opposite to a tensioning direction thereby defining a maximum camber of the one of the first and second tensioning contours; and
- the other of the first and second tensioning contours forms a straight line.

6. The screen tensioner of claim 5, wherein:
- an amount of the maximum camber of the one of the first and second tensioning contours is less than or equal to 25 mm.

7. The screen tensioner of claim 1, wherein:
- the tensioning bar includes a top surface and a bottom surface extending between the first and second tensioning edges, and the tensioning bar is symmetrical to an imaginary central transverse plane lying between the top surface and the bottom surface and extending between the first and second tensioning edges.

8. The screen tensioner of claim 1, wherein:
- the tensioning bar includes at least one identifying marker identifying at least one of the first and second tensioning edges.

9. The screen tensioner of claim 8, wherein:
- the at least one identifying marker includes a recess formed in at least one of the longitudinal end portions of the tensioning bar.

10. The screen tensioner of claim 1, wherein:
- at least one of the first and second tensioning contours is circular or elliptical in shape.

11. The screen tensioner of claim 1, wherein:
- at least one of the first and second tensioning contours includes several contour sections of differing contour.

12. The screen tensioner of claim 1, wherein:

at least one of the first and second tensioning contours follows a continuously differentiable function in a direction between the two fastening sections.

13. A screening machine, comprising:

a screen lining; and a tensioning bar including a central tensioning section located between two fastening sections, the fastening sections being formed on two longitudinal end portions of the tensioning bar, the tensioning bar including first and second oppositely facing tensioning edges defined on the tensioning section, the first tensioning edge forming a first tensioning contour and the second tensioning edge forming a second tensioning contour, the first and second tensioning contours having different geometries from each other, wherein one of the first and second tensioning edges engages the screen lining.

14. The screening machine of claim 13, wherein:

the screen lining includes a fastening edge having a cross-section configured as a bend; and the one of the first and second tensioning edges engages the bend of the fastening edge.

15. The screening machine of claim 13, further comprising:

two tensioning devices engaging the fastening sections of the tensioning bar to apply a tensioning force to the tensioning bar.

16. The screening machine of claim 13, wherein:

one of the first and second tensioning contours has a convex curvature extending between the two fastening sections, and the other of the first and second tensioning contours has a convex or concave curvature or extends in a straight line between the two fastening sections.

17. The screening machine of claim 13, wherein:

the tensioning bar includes a top surface and a bottom surface extending between the first and second tensioning edges; and at least one of the first and second tensioning contours includes two contour end sections and a contour center between the contour end sections, and an intersection of the first and second tensioning contours with an imaginary central transverse plane lying between the top surface and the bottom surface and extending between the first and second tensioning edges has the contour center of the at least one of the first and second tensioning contours offset with respect to the contour end sections of the at least one of the first and second tensioning contours in or opposite to a tensioning direction thereby defining a maximum camber of the at least one of the first and second tensioning contours.

18. The screening machine of claim 17, wherein:

an amount of the maximum camber of the at least one of the first and second tensioning contours is less than or equal to 25 mm.

19. The screening machine of claim 13, wherein:

the tensioning bar includes at least one identifying marker identifying at least one of the first and second tensioning edges.

20. The screening machine of claim 19, wherein:

the at least one identifying marker includes a recess formed in at least one of the longitudinal end portions of the tensioning bar.

* * * * *